United States Patent
Haerdt

(10) Patent No.: US 12,333,825 B2
(45) Date of Patent: Jun. 17, 2025

(54) DETERMINATION OF A MOUNTING CONFIGURATION OF A SENSOR FOR MOTOR VEHICLES

(71) Applicant: Robert Bosch GmbH, Stuttgart (DE)

(72) Inventor: Christian Haerdt, Bretten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 449 days.

(21) Appl. No.: 17/909,905

(22) PCT Filed: Mar. 10, 2021

(86) PCT No.: PCT/EP2021/055971
§ 371 (c)(1),
(2) Date: Sep. 7, 2022

(87) PCT Pub. No.: WO2021/185637
PCT Pub. Date: Sep. 23, 2021

(65) Prior Publication Data
US 2023/0104541 A1      Apr. 6, 2023

(30) Foreign Application Priority Data

Mar. 17, 2020 (DE) .................. 10 2020 203 392.7

(51) Int. Cl.
*G06V 20/58* (2022.01)
*B60W 40/10* (2012.01)

(52) U.S. Cl.
CPC ............. *G06V 20/58* (2022.01); *B60W 40/10* (2013.01); *B60W 2420/408* (2024.01)

(58) Field of Classification Search
CPC  G06V 20/58; B60W 40/10; B60W 2420/408; G01S 2013/9327; G01S 13/87; G01S 7/4026
See application file for complete search history.

(56) References Cited

U.S. PATENT DOCUMENTS

2015/0276923 A1  10/2015  Song et al.
2017/0261599 A1*  9/2017  Zeng .................. G01S 13/08
(Continued)

FOREIGN PATENT DOCUMENTS

DE  102014017917 B3  11/2015
DE  102015118085 A1   4/2017
(Continued)

OTHER PUBLICATIONS

International Search Report for PCT/EP2021/055971, Issued Jun. 17, 2021.

*Primary Examiner* — Iriana Cruz
(74) *Attorney, Agent, or Firm* — NORTON ROSE FULBRIGHT US LLP

(57) ABSTRACT

A sensor and a method for the sensor, for determining an actual mounting configuration of the sensor on a motor vehicle. The sensor is designed to be mounted in different mounting configurations and to be operated in each of the different mounting configurations. The method includes: determining a misalignment of the sensor relative to a mounting configuration to be tested, measurement data of a measurement method being interpreted based on the mounting configuration to be tested, assumed as correct; and recognizing as correct or incorrect the mounting configuration to be tested based on the determined misalignment of the sensor; in the case in which a mounting configuration to be tested is recognized as correct, this mounting configuration being determined as the actual mounting configuration of the sensor.

10 Claims, 2 Drawing Sheets

(56) References Cited

U.S. PATENT DOCUMENTS

| | | |
|---|---|---|
| 2020/0033444 A1 | 1/2020 | Marsch |
| 2021/0018523 A1* | 1/2021 | Stacey .................. C12M 23/50 |
| 2021/0018629 A1* | 1/2021 | Kohn .................... G01S 17/931 |
| 2021/0131838 A1* | 5/2021 | Pinkelman ............ G01S 7/4086 |

FOREIGN PATENT DOCUMENTS

| | | |
|---|---|---|
| DE | 102017105305 A1 | 9/2017 |
| EP | 3290945 A1 | 3/2018 |
| JP | 2010246088 A | 10/2010 |
| JP | 2018508756 A | 3/2018 |
| JP | 2019174218 A | 10/2019 |

* cited by examiner

DETERMINATION OF A MOUNTING CONFIGURATION OF A SENSOR FOR MOTOR VEHICLES

FIELD

The present invention relates to a sensor for motor vehicles for acquiring objects in the traffic environment of a motor vehicle, the sensor being set up to carry out a measurement method for determining a misalignment of a sensor.

SUMMARY

It is desirable to be able to mount two or more identical location sensors at different positions in a vehicle, or with different mounting configurations. In particular, it is desirable to be able to use sensors of the same type, i.e., only one single type of a component, having a single component number. This simplifies variant management, replacement part management, and more, in comparison with the provision of different components for each mounting configuration. In the case of a radar sensor, different mounting configurations may be for example a right rear corner for a medium-range radar and a left rear corner for the other medium-range radar sensor, in order to implement a blind spot detection function at both sides of the vehicle.

An object of the present invention is to facilitate the setting up of a sensor for motor vehicles for an actual mounting configuration from a plurality of different mounting configurations for which the sensor is designed.

According to the present invention, the object may be achieved by a sensor of the type named above that is designed to be mounted on the motor vehicle in different mounting configurations and to be operated in each of the different mounting configurations, the sensor being set up to carry out a method for determining its actual mounting configuration from the different mounting configurations. According to an example embodiment of the present invention, the method includes:
  determining a misalignment of the sensor relative to a mounting configuration to be tested on the basis of measurement data of the measurement method, the measurement data of the measurement method being interpreted based on the mounting configuration to be tested, assumed to be correct; and
  recognizing as correct or incorrect the mounting configuration to be tested based on the determined misalignment of the sensor, at least in the case in which the mounting configuration to be tested is recognized as incorrect, the steps of determining a misalignment and of recognizing a mounting configuration as correct or incorrect being carried out for at least one additional mounting configuration of at least two mounting configurations to be tested,
  in the case in which a mounting configuration is recognized as correct, this mounting configuration being determined as the actual mounting configuration of the sensor.

The interpreting of the measurement data of the measurement method based on the mounting configuration to be tested assumed as correct means that the measurement data of the measurement method are interpreted as if the sensor were mounted on the motor vehicle in a mounting configuration that corresponds to the mounting configuration to be tested.

In the method for determining the actual mounting configuration of the sensor, in this way it is exploited that, when the measurement method for determining the misalignment of the sensor is carried out, or in the interpretation of measurement data of the measurement method only when the measurement data are interpreted under the assumption of the actually correct mounting configuration as the correct mounting configuration, a permissible misalignment of the sensor can be determined. However, if the sensor is mounted on the vehicle in some other mounting configuration, then, because the measurement data of the measurement method are interpreted under the assumption of a false, incorrect mounting configuration, a misalignment of the sensor that is within permissible limits cannot be determined. Rather, depending on the difference between the mounting configurations, an impermissibly large misalignment of the sensor will be determined, or an impermissible, e.g. not quantifiable, misalignment of the sensor will be determined.

According to an example embodiment of the present invention, it is particularly advantageous that a measurement method that is already implemented in the sensor anyway can be used to determine the misalignment of the sensor in order to, in addition to the determination of the misalignment of the sensor for a correct mounting configuration, also permit the determination of the actual mounting configuration from the various provided mounting configurations. For this purpose, the measurement method, or the interpretation of the measurement data of the measurement method, can easily be carried out multiple times for different mounting configurations. For each incorrect mounting configuration, a misalignment of the sensor outside a permissible range is determined, and a permissible misalignment of the sensor is determined only for the correct mounting configuration.

Thus, in the determination of a misalignment of the sensor, the measurement data of the measurement method are interpreted under the assumption of the mounting configuration that is to be tested, in order to determine the misalignment. It is particularly advantageous that identical sensors of the same type can be mounted in different mounting configurations, and subsequently the actual mounting configuration of each of the sensors can be determined.

According to an example embodiment of the present invention, the sensor is designed to be operated in each of the different mounting configurations. In the sensor, for example different functions, for example in the form of different operating methods or software methods, and/or different parameter configurations or software configurations for operation in each of the different mounting configurations can be implemented.

The misalignment in relation to a mounting configuration to be tested can be determined for example as a misalignment relative to a target alignment assigned to one of the mounting configurations to be tested.

In one or more specific embodiments of the present invention, the determination of a misalignment of the sensor in relation to a mounting configuration to be tested includes a carrying out of the measurement method based on the mounting configuration to be tested, assumed as correct. In one or more other specific embodiments, in contrast, the measurement data of a measurement method, carried out once, is interpreted differently for at least two different mounting configurations of the mounting configurations to be tested. In this way, measurement data of the measurement method can be interpreted multiple times, under the assumption in each case of different mounting configurations to be tested.

Preferably, the sensor is a location sensor, i.e., the sensor is set up to locate objects in the traffic environment of the motor vehicle.

Preferably, the at least one further mounting configuration of the at least two mounting configurations to be tested differs from each mounting configuration already recognized as incorrect.

The determination of the actual mounting configuration of the different mounting configurations can also be referred to as ascertaining the actual mounting configuration of the different mounting configurations.

The step of determining a misalignment can for example be carried out for different mounting configurations to be tested before the step of recognizing as correct or incorrect a mounting configuration to be tested is carried out for one or more of the mounting configurations to be tested.

Advantageous specific example embodiments of the present invention are disclosed herein.

Preferably, in the method for determining the actual mounting configuration, the recognition as correct or incorrect of the mounting configuration to be tested takes place based on the determined misalignment of the sensor on the basis of a distinction of cases as to whether a measure of a misalignment is determined that is within a range of misalignment that is permissible for the mounting configuration under consideration. The permissible range of a misalignment can be determined for example by a permissible largest measure of a misalignment. If a measure of a misalignment that is within the permissible range is not determined, then the mounting configuration to be tested is recognized as incorrect. In general, this is the case when an impermissible misalignment is determined. This can be the case for example when a measure of a misalignment is determined that is outside the permissible range, or when the misalignment is not quantifiable. Typically, the differences between the different mounting configurations are significantly greater than the respective ranges of the permissible misalignments of a sensor in a mounting configuration.

The different mounting configurations to be tested can differ for example by different lateral positions on the motor vehicle, which can include different mirror-symmetrical lateral positions on the motor vehicle (e.g. left, right) and/or different lateral distances from the central longitudinal axis of the motor vehicle (e.g. outer, inner positions), and/or by different orientations of a central axis of a sensor field of view in the azimuth (e.g. front, rear, side orientation).

In the simplest case, for example two mounting configurations can be distinguished corresponding to a left position and a right position on the motor vehicle. For example, mounting configurations with different mounting positions, including a front mounting position and a rear mounting position, on the motor vehicle can also be distinguished. For example, mounting configurations with different mounting positions corresponding to an outer mounting position and an inner mounting position can also be distinguished. For example, mounting configurations that correspond to combinations of the mounting configurations named above can also be distinguished. Thus, for example for mounting positions on a vehicle front or on a vehicle rear, a distinction can be made between a left outer mounting configuration, a left inner mounting configuration, a right inner mounting configuration, and a right outer mounting configuration.

Mounting configurations can be distinguished having different mounting positions, corresponding to a lateral mounting position and a front-side or rear-side mounting position.

Preferably, the different mounting configurations include mounting configurations having different mounting positions that can be simultaneously occupied by respective individual sensors of the same type. Thus, in a motor vehicle for example one sensor can be mounted at the left and a sensor of the same type can be mounted at the right.

In one or more specific embodiments of the present invention, the different mounting configurations include mounting configurations having differing target orientations of a sensor axis of the sensor. This sensor axis can be in particular a central axis of a field of view of the sensor, or a sensor axis situated transverse to a central axis of the field of view of the sensor, in particular a vertical axis of the sensor. For example, the target orientation can differ by at least 5°, further preferably by at least 10°, further preferably by at least 90°. In this way, for example mounting configurations can be distinguished in which sensors are configured so as to be rotated by 180° about a central axis of a field of view of the radar sensor.

In the method for determining the actual mounting configuration, in the case in which a mounting configuration to be tested is recognized as correct, this mounting configuration can be used as a basis in the subsequent operation of the sensor. For example, the sensor can have a configuration memory for storing the configuration determined by the method for determining the actual mounting configuration as a correctly recognized mounting configuration. In the simplest case, when exactly two mounting configurations are to be distinguished, the configuration memory can for example have one bit for the description of the mounting configuration, for example a mounting direction. The configuration memory can for example have a capacity of one bit.

In one or more specific embodiments of the present invention, the sensor is set up to carry out a calibration of the sensor on the basis of the misalignment of the sensor determined for the mounting configuration recognized as correct. In this way, after recognizing the actual mounting configuration, the sensor can also carry out, in a conventional manner, a calibration on the basis of the misalignment determined on the basis of the measurement data from the measurement method. A calibration can take place for example through a parameter adaptation and/or computational compensation of the misalignment. A calibration can for example also take place through a mechanical adaptation of an orientation of the sensor, using a mechanical calibration device of the sensor, based on the determined misalignment.

In one or more specific embodiments of the present invention, the measurement method for determining a misalignment of the sensor includes a location measurement of at least one object.

In one or more specific embodiments of the present invention, the sensor is a radar sensor.

However, the sensor can also for example be a sensor that includes a camera for acquiring the traffic environment of the motor vehicle.

The object may further be achieved by a method according to the present invention.

Preferably, the sensor is set up to externally output information about the mounting configuration recognized as correct via a communication unit, for example to an external control device or to another sensor of the same type. This enables a calibration of the mounting configurations in question between a plurality of sensors.

Exemplary embodiments of the present invention are explained in more detail in the following on the basis of the figures.

DETAILED DESCRIPTION OF EXAMPLE EMBODIMENTS

Figure 1:
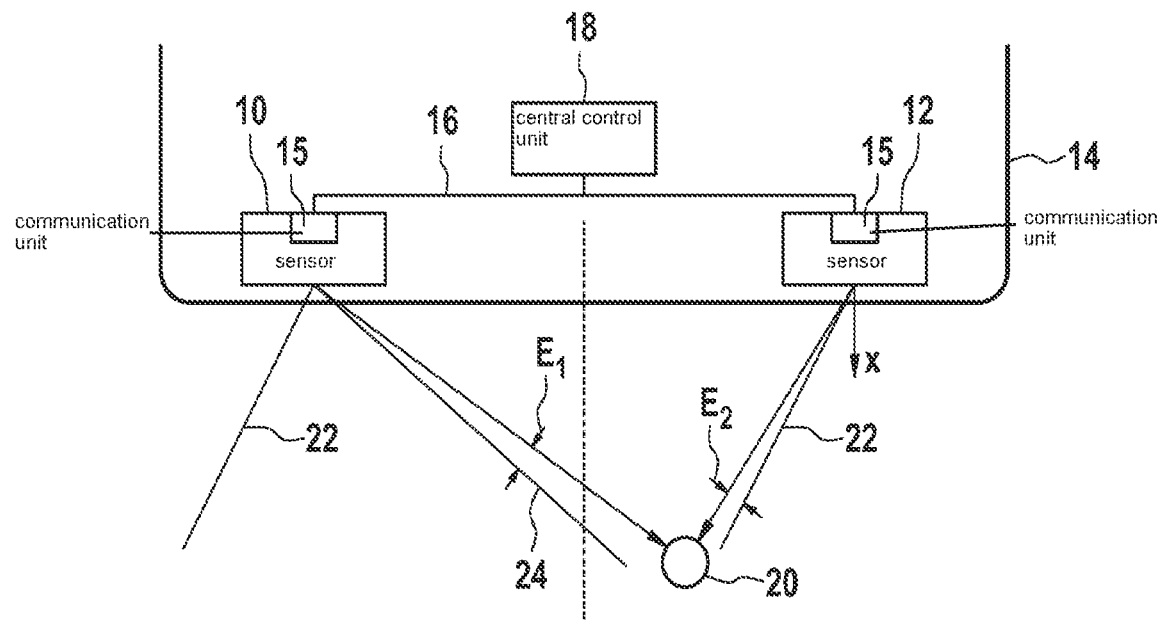
FIG. 1 shows a schematic representation of two sensors in a mounting situation on a motor vehicle.

FIG. 1 schematically shows a mounting situation of two radar sensors 10, 12 of the same type for motor vehicles, for acquiring objects in the traffic environment of a motor vehicle 14. Sensors 10, 12 are situated on the vehicle front, having a central axis of the field of view in the direction x. Radar sensors 10, 12 each have a communication unit 15 via which they are connected to a central control unit 18 via a bus 16.

FIG. 1 shows a situation in which a reference object 20 is configured asymmetrically relative to a center plane between radar sensors 10, 12. Radar sensors 10, 12 therefore acquire reference object 20 from different angles and different distances.

Each of the two radar sensors 10, 12 then carries out a measurement method for determining a misalignment of the sensor, in which reference object 20 is located and the located position relative to radar sensor 10, or 12, is compared to a reference position provided for example for the left radar sensor 12, at which reference position reference object 20 is situated. In FIG. 1, the reference position is identified by reference direction 22. In the depicted example, radar sensor 12 determines for example the measured object angle of reference object 20, which deviates from reference direction 22 by a slight misalignment $E_2$, under the assumption of the left front mounting position of radar sensor 12, which is correct here. Radar sensor 12 therefore recognizes the mounting configuration corresponding to the left front mounting position as correct.

For example under the assumption of a left front mounting position as mounting configuration, right radar sensor 10 determines a significant deviation of the position of reference object 20 from target direction 22, and therefore recognizes this left mounting configuration as incorrect. In a test of the alternative mounting configuration corresponding to the right front mounting position, a reference direction 24 of reference object 20 is expected. This direction is acquired for example except for a misalignment $E_1$ of radar sensor 10. Radar sensor 10 thereupon recognizes the mounting configuration corresponding to the right position as correct. The method is explained in more detail below.

The recognition shown in FIG. 1 of the mounting configuration of each radar sensor 10, 12 can take place on the basis of the determination of the respective misalignment $E_1$, $E_2$ of the radar sensor in the context of a reference object measurement. If, after a first installation or replacement installation of a sensor, a calibration takes place anyway in order to determine the misalignment of the sensor, the mounting configuration can thus automatically also be recognized by the respective sensor.

However, measurement methods for determining a misalignment of a sensor 10, 12 during running operation of the sensor can also be used to determine the mounting configuration of the respective sensor automatically after the first commissioning of motor vehicle 14, or after a new installation of a sensor 10 or 12. Misalignments of sensor 10, 12 can be determined for example on the basis of statistical evaluations of initially unknown positions of different reflections during the trip.

Figure 2:
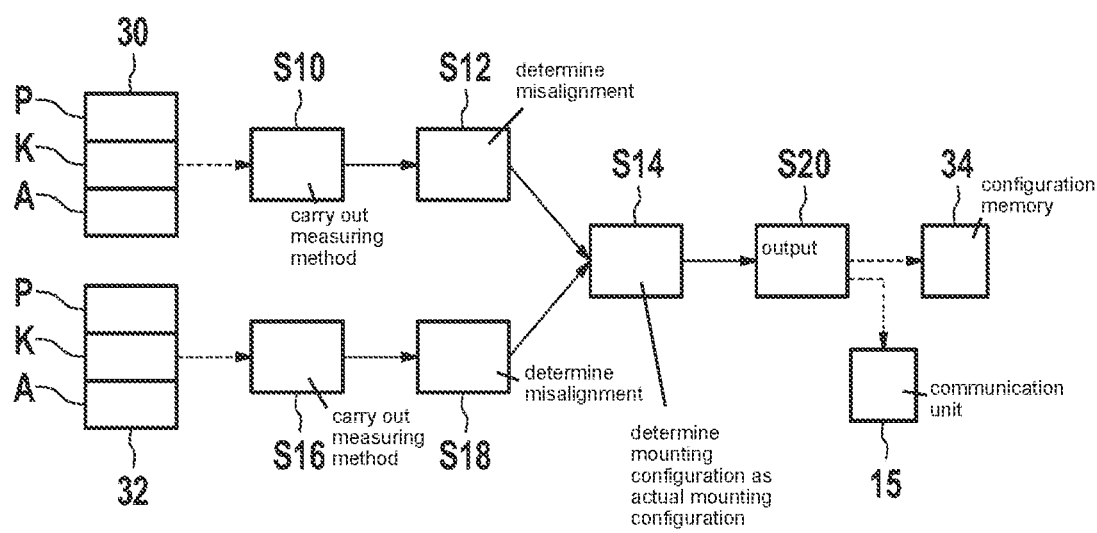
FIG. 2 shows a schematic representation of a method for determining a mounting configuration of a sensor, according to an example embodiment of the present invention.

FIG. 2 schematically shows a method for determining an actual mounting configuration of a sensor that can be implemented for example in the respective sensor 10, 12 of FIG. 1.

Sensor 10, 12 is designed to be installed on the motor vehicle in different mounting configurations and to be operated in each of the different mounting configurations. Different mounting configurations 30, 32 can for example include in each case a number of the mounting configuration P, (X, Y, Z) coordinates K, and a mounting angle A, and are for example taken as a basis in a step S10 for carrying out a measurement method for determining a misalignment of sensor 10, 12 relative to the assumed mounting configuration 30. In a step S12, on the basis of the obtained measurement data a misalignment $E_1$, $E_2$ of sensor 10, 12 is determined relative to mounting configuration 30 to be tested. If, in a step S14, based on the determined misalignment $E_1$ or $E_2$, mounting configuration 30 to be tested is recognized as incorrect, then in a step S16, under the assumption of further mounting configuration 32 to be tested, the measurement method for determining the misalignment of sensor 10, 12 is carried out again on the basis of mounting configuration 32. In turn, in a step S18 misalignment $E_1$ or $E_2$ of sensor 10, 12 is determined. If in step S14 the second tested mounting configuration 32 is recognized as correct, then, based on the determined misalignment of sensor 10, 12, in step S14 this mounting configuration 32 is determined as the actual mounting configuration of sensor 10, 12, and in step S20 is written to a configuration memory 34 of the sensor. Here it can for example be adequate to store one bit in order to distinguish the two mounting configurations 30, 32 (P=0, P=1) on the basis of a mounting direction. In step S20, mounting configuration 30, 32 recognized as correct can also be outputted externally for example via a communication unit 15, for example to an external control device 18 or to another sensor 10, 12 of the same type. Steps S16 and S18 can also be carried out before step S14.

Such a method is not limited to the measurement of a reference object 20, but for example can also be carried out during running operation of a motor vehicle in unknown environments.

Figure 3:
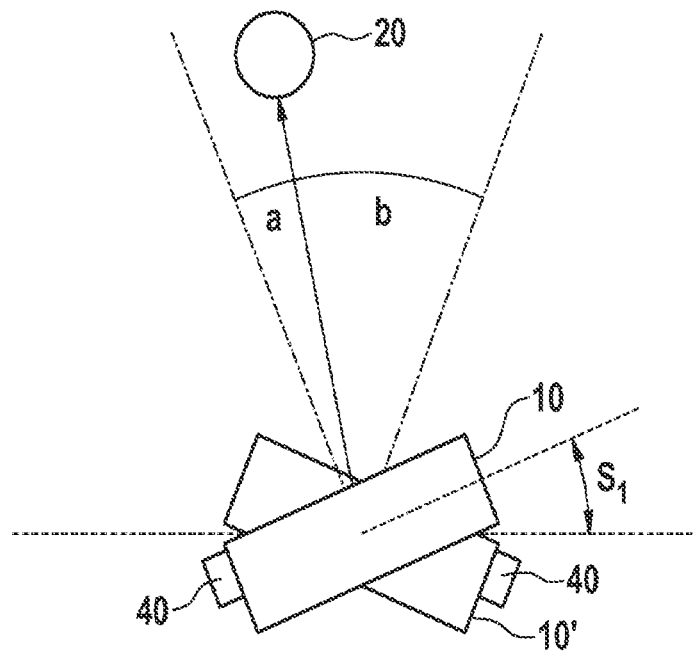
FIG. 3 shows a situation with two possible mounting configurations at the same mounting position, according to an example embodiment of the present invention.

FIG. 3 shows a situation in which a radar sensor 10 can be installed in two different mounting configurations at the same mounting position, which configurations differ by a rotation of radar sensor 10 by 180° about its central axis (shown as a dash-dot line) of the field of view, a target orientation $S_1$ relative to the transverse direction of the vehicle also being shown in FIG. 3. In the mounting configuration with plug 40 oriented towards the left, radar sensor 10 detects reference object 20 at an angle a that for example, taking into account target orientation $S_1$, corresponds to the reference angle of reference object 20 except for a misalignment. In the other mounting configuration corresponding to radar sensor 10', this sensor in contrast detects reference object 20 at a negative, larger angle b. Again, corresponding to the method according to FIG. 2, a recognition of the correct mounting position is possible on the basis of the respectively determined misalignment.

If the mounting configurations shown in FIG. 3 are of a radar sensor 10 mounted on a side of a vehicle, then during operation of radar sensor 10 radar sensor 10 will detect a relative movement of static objects 20 during forward travel, typically in one direction. If for example radar sensor 10, or 10', of FIG. 3 is mounted on a right side of a vehicle, then for radar sensor 10 in the one mounting configuration with plug 40 directed towards the front, static objects 20 will move "towards the side without plug 40," while in the other mounting configuration of radar sensor 10' static objects 20 will typically move "towards the side with the plug." It is therefore easily possible to distinguish the mounting configurations.

Correspondingly, a distinction of mounting configurations can also take place laterally to the left and laterally to the right on the motor vehicle if for example the side with plug 40 is always directed forward.

For example in the case of radar sensors 10, 12 mounted on the front side, mounting configurations can also be distinguished on the basis of different yaw rates of radar objects 20 acquired during travel along a curve.

Figure 4:
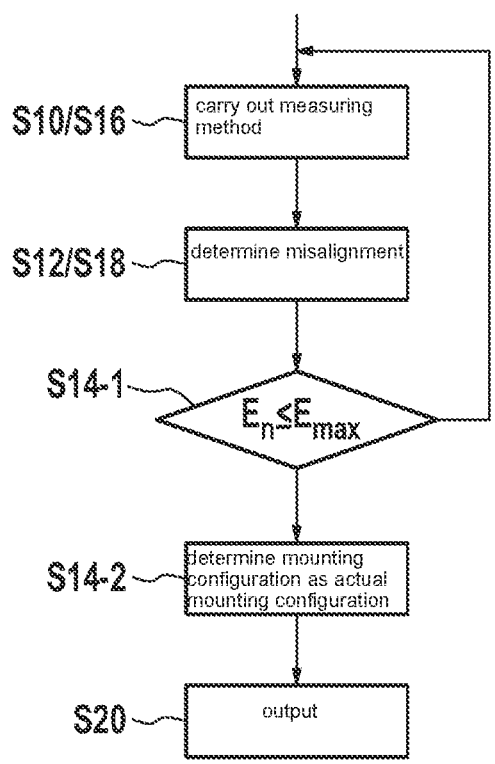
FIG. 4 shows a schematic representation of a method for determining a mounting configuration of a sensor, according to an example embodiment of the present invention.

FIG. 4 illustrates a variant of the method according to FIG. 2, in which first a misalignment $E_1$, $E_2$ of sensor 10, 12, determined in step S10, relative to mounting configuration 30 to be tested is determined (S12), and it is then decided whether mounting configuration 30 to be tested is recognized as correct (S14-1). If this is not the case, then for the next mounting configuration 32 to be tested steps S10, S12 are repeated (corresponding to steps S16, S18). If a mounting configuration 30, 32 to be tested is recognized as correct (S14-1), based on a misalignment that is smaller than or equal to a permissible largest measure of a misalignment ($E_n \leq E_{max}$), then this mounting configuration 30, 32 is determined as the actual mounting configuration of sensor 10, 12 (S14-2), and the storing and/or outputting of the mounting configuration takes place in step S20.

What is claimed is:

1. A sensor for a motor vehicle, for acquiring objects in a traffic environment of the motor vehicle, the sensor being configured to carry out a measurement method for determining a misalignment of the sensor, wherein:

the sensor is configured to be mounted on the motor vehicle in different mounting configurations and to be operated in each of the different mounting configurations, the sensor is configured to carry out a method for determining an actual mounting configuration of the sensor from the different mounting configurations, the method including:

determining a misalignment of the sensor relative to a mounting configuration to be tested, based on measurement data of the measurement method, the measurement data of the measurement method being interpreted based on the mounting configuration to be tested, assumed as correct, and recognizing as correct or incorrect the mounting configuration to be tested, based on the determined misalignment of the sensor, based on the mounting configuration to be tested being recognized as incorrect, the steps of determining the misalignment and of recognizing the mounting configuration as correct or incorrect are carried out for at least one further mounting configuration of at least two mounting configurations to be tested, and based on the mounting configuration to be tested being recognized as correct, the mounting configuration being determined as an actual mounting configuration of the sensor.

2. The sensor for motor vehicles as recited in claim 1, wherein the recognition as correct or incorrect of the mounting configuration to be tested takes place, in the method for determining the actual mounting configuration, based on the determined misalignment of the sensor on the basis of a distinction of cases as to whether a measure of a misalignment is determined that is within a range of a misalignment that is permissible for the mounting configuration under consideration.

3. The sensor for motor vehicles as recited in claim 1, wherein the different mounting configurations include mounting configurations with different mounting positions that can be simultaneously occupied by respective individual sensors of the same type.

4. The sensor for motor vehicles as recited in claim 1, wherein the different mounting configurations include mounting configurations with differing target orientation of a sensor axis of the sensor.

5. The sensor for motor vehicles as recited in claim 1, wherein the sensor has a configuration memory for storing the mounting configuration recognized as correct in the method for determining the actual mounting configuration.

6. The sensor for motor vehicles as recited in claim 1, wherein the sensor is configured to carry out a calibration of the sensor based on the misalignment of the sensor determined for the mounting configuration recognized as correct.

7. The sensor for motor vehicles as recited in claim 1, wherein the measurement method for determining a misalignment of the sensor includes a location measurement of at least one object.

8. The sensor for motor vehicles as recited in claim 1, wherein the sensor is a radar sensor.

9. The sensor for motor vehicles as recited in claim 1, wherein the sensor is set up to externally output information about the mounting configuration recognized as correct, via a communication unit.

10. A method for determining an actual mounting configuration of a sensor on a motor vehicle, the sensor being configured to be mounted in different mounting configurations and to be operated in each of the different mounting configurations, and the sensor is configured to carry out a measurement method for determining a misalignment of the sensor, the method comprising the following steps:

determining a misalignment of the sensor relative to a mounting configuration to be tested based on measurement data of the measurement method, the measurement data of the measurement method being interpreted based on the mounting configuration to be tested, assumed as correct;

recognizing as correct or incorrect the mounting configuration to be tested, based on the determined misalignment of the sensor;

based on the mounting configuration to be tested being recognized as incorrect, the steps of determining a misalignment and of recognizing as correct or incorrect a mounting configuration are carried out for at least one further mounting configuration of at least two mounting configurations to be tested; and based on the mounting configuration to be tested is recognized as correct, determining the mounting configuration to be tested as an actual mounting configuration of the sensor.

* * * * *